United States Patent [19]

Zrostlik

[11] Patent Number: 4,787,809
[45] Date of Patent: Nov. 29, 1988

[54] HYDRAULIC LIFT GATE

[75] Inventor: Francis L. Zrostlik, Garner, Iowa

[73] Assignee: Iowa Mold Tooling Company, Incorporated, Garner, Iowa

[21] Appl. No.: 25,653

[22] Filed: Mar. 13, 1987

[51] Int. Cl.⁴ ............................................. B60P 1/44
[52] U.S. Cl. .................................... 414/557; 414/917
[58] Field of Search ............... 414/557, 469, 471, 472, 414/480, 486, 495, 545, 556, 546, 921, 917

[56] References Cited

U.S. PATENT DOCUMENTS

| | | | |
|---|---|---|---|
| 2,683,540 | 7/1954 | Wood | 414/557 |
| 2,979,214 | 4/1961 | Selzer | 414/557 |
| 3,305,112 | 2/1967 | Brown | 414/557 |
| 3,474,921 | 10/1969 | Rossoni | 414/557 |
| 3,842,997 | 10/1974 | Sprikkelman | 414/557 |
| 4,168,134 | 9/1979 | Pohl | 414/921 |

FOREIGN PATENT DOCUMENTS 2261899 9/1975 France ............................ 414/557

Primary Examiner—Leslie J. Paperner
Assistant Examiner—David A. Bucci
Attorney, Agent, or Firm—Wood, Dalton, Phillips, Mason & Rowe

[57] ABSTRACT

A lift gate assembly including a U-shaped base having horizontal central section flanked by parallel upstanding legs, a gate, and a pair of upstanding legs secured to the gate in alignment with the legs and the base. Links extending between the legs define two parallelogram linkages and a torsion bar extends between and is rigidly attached to a corresponding link in each of the parallelogram linkages. Preferably, the torsion bar defines the lower pivot of the parallelogram linkage and extends between the legs of the base and the lowermost links in each parallelogram linkage, being rigidly attached thereto. Hydraulic cylinders are provided for each parallelogram linkage to raise and lower the gate.

8 Claims, 2 Drawing Sheets

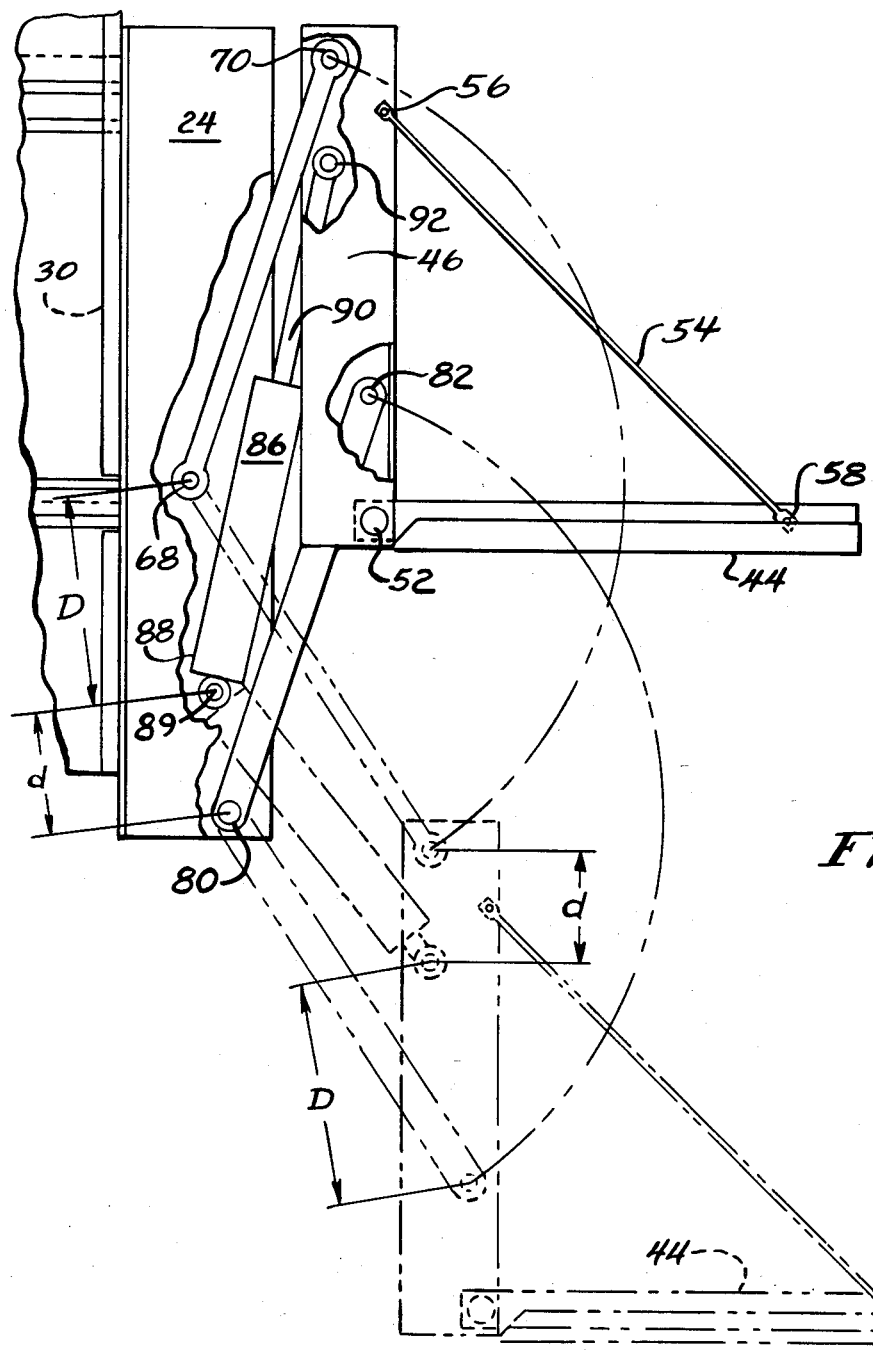

HYDRAULIC LIFT GATE

FIELD OF THE INVENTION

This invention relates to a lift gate assembly, and more particularly, to a lift gate assembly that may be fitted to a small or medium size truck such as a pick-up truck, van or the like.

BACKGROUND OF THE INVENTION

For many years, the advantages of providing a cargo carrying vehicle such as a truck with a lift gate has been recognized. As is well known, lift gates are gates which not only close the rear of the bed of the vehicle, but which, when in a horiztontal position, may be moved between a first position wherein they are an extension of the truck bed and a second position resting on the underlying terrain. Cargo may be loaded on or removed from the gate while in the latter position or loaded into or unloaded from the vehicle bed when in the former position.

Conventionally, some sort of motor is utilized to drive the lift gate between the two positions and there will generally be provided some sort of linkage which maintains the upper surface of the gate in a generally horizontal plane during such movement to prevent cargo on the gate from falling off.

Early versions of lift gates were generally not suited for small or medium sized cargo carrying vehicles because the linkage and the drive system for moving the gate between upper and lowered positions was adapted to be located wholly below the plane of the truck bed. This, in turn, required that the bed of the truck be relatively high above the underlying terrain to provide the requisite ground clearance; and this in turn essentially limited the provision of lift gates to relatively large cargo carrying vehicles with high road clearances.

To overcome this difficulty, in the 1960's, William D. Brown, in his U.S. Pat. No. 3,305,112, proposed a lift gate assembly that could be fitted to relatively small vehicles such as pick-up trucks, vans or the like. Brown proposed the use of a U-shaped base having upstanding legs. The top of the base was in the plane of the truck bed and immediately below it was a horizontally extending hydraulic cylinder acting on a cable system for raising and lowering the gate. The linkage for controlling gate position during raising and lowering was generally mounted at or above the plane of the truck bed within the upstanding legs of the base assembly and connected to the gate above the plane thereof via upstanding legs to which the gate was secured.

Brown's lift gate assembly worked very well for its intended purpose and was commercially successful. Nonetheless, it had a number of drawbacks.

Because the Brown lift gate was intended as an accessory for addition to pick-up trucks, efforts were made to minimize its weight. The reduced weight factor coupled with the particular form of hydraulic elevating drive for the gate employed frequently made it difficult to lower the gate in cold conditions.

Secondly, and again because of weight considerations resulting in a gate with considerably less rigidity than that found in previous lift gate assemblies used with large trucks, there was the possibility for undesirable torsional twisting from one side of the gate to the other when a load was not centered thereon. This "tipiness" contributed to considerable instability.

Furthermore, the Brown gate elevating system tended to generate the greatest lifting power when the gate was near its uppermost position whereas, it would be desirable to have the greatest lifting power available when the gate was at its lowermost position whereat it must not only be able to lift the load, it must also be able to overcome inertia to initiate the lifting process.

The present invention is directed to overcoming one or more of the above problems.

SUMMARY OF THE INVENTION

It is the principal object of the invention to provide a new and improved lift gate assembly for use on small or medium sized vehicles such as pick-up trucks and vans. More specifically, it is an object of the invention to provide such a lift gate assembly wherein maximum lifting power is provided when the gate is at its lowermost position and/or any tendency of the gate to tip as a result of lack of rigidity and off center loading is eliminated; and/or the lift gate assembly may be operated with equal facility in both hot and cold environments.

According to one facet of the invention, the foregoing objects are achieved in a lift gate assembly which includes a generally U-shaped base having a generally horizontal central section flanked by generally parallel upstanding legs. The assembly includes a gate and a pair of upstanding legs are secured to the gate in spaced relation so as to be aligned with corresponding legs on the base. Two pair of parallelogram forming links are pivotally connected to and extend between each of the legs on the base and the corresponding leg in the pair. Motor means interconnect the base and the gate and are operable to cause relative movement between the same along a path defined by the parallelogram linkage. According to the invention, a torsion bar extends between and is rigidly attached to a corresponding link in each of the pairs of links. The torsion bar prevents skewing or twisting of the gate as a result of uncentered loads.

According to another facet of the invention, the two parallelogram linkages are each defined by one leg on the base and the corresponding leg on the gate and two interconnecting links and have upper and lower pivots on the leg on the base and upper and lower pivots on the leg on the gate. Two hydraulic cylinders are provided, one for each parallelogram linkage. Each cylinder has one end pivotally connected to the leg on the base at a location closer to the lower pivot thereon than to the upper pivot thereon and the other end pivotally connected to the leg on the gate at a location closer to the upper pivot thereon than to the lower pivot thereon.

This construction provides for maximum lifting power when the gate is in its lowermost position.

The use of hydraulic cylinders as a lifting means can provide still a further advantage. According to a highly preferred form of the invention, the cylinders are double acting. Consequently, hydraulic fluid under pressure may be directed to the cylinders to alternatively raise the gate or lower the gate. In the case of the latter, lowering is positive, under the influence of a motor, and does not depend upon gravity. Thus, positive movement of the gate to a lowered position even in cold conditions can be assured.

In a highly preferred embodiment, the torsion bar defines the lower pivot on each of the legs of the base and preferably is located below the upper surface of the base so as to not obstruct free movement of cargo from the top of the gate to the truck bed when the gate is in the uppermost position.

A pump and motor system may also be located in the center section of the base below the upper extremity thereof.

Other objects and advantages will become apparent from the following specification taken in connection with the accompanying drawings.

DESCRIPTION OF THE DRAWINGS

FIG. 3 is an enlarged, fragmentary side elevation of the lift gate showing the same in its raised position in solid lines and in its lowered position in dotted lines; and FIG. 4 is a hydraulic schematic of one possible type of control system for the lift gate assembly.

DESCRIPTION OF THE PREFERRED EMBODIMENT

Figure 1:
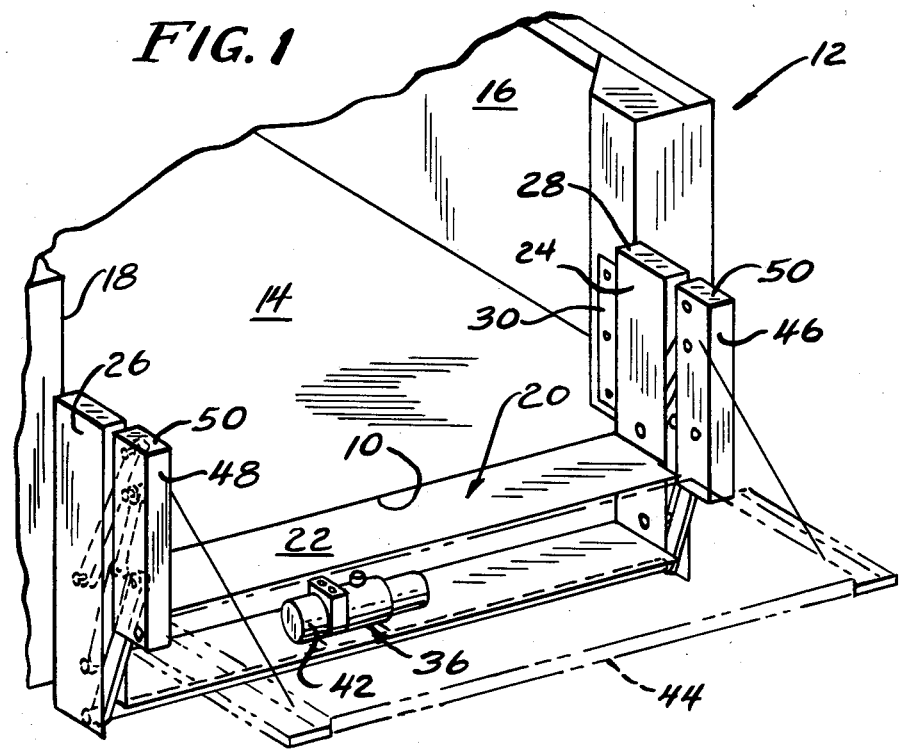
FIG. 1 is a perspective view of a lift gate assembly made according to the invention in a raised invention and with certain components shown in a dotted line to enable others to be viewed.
Figure 2:
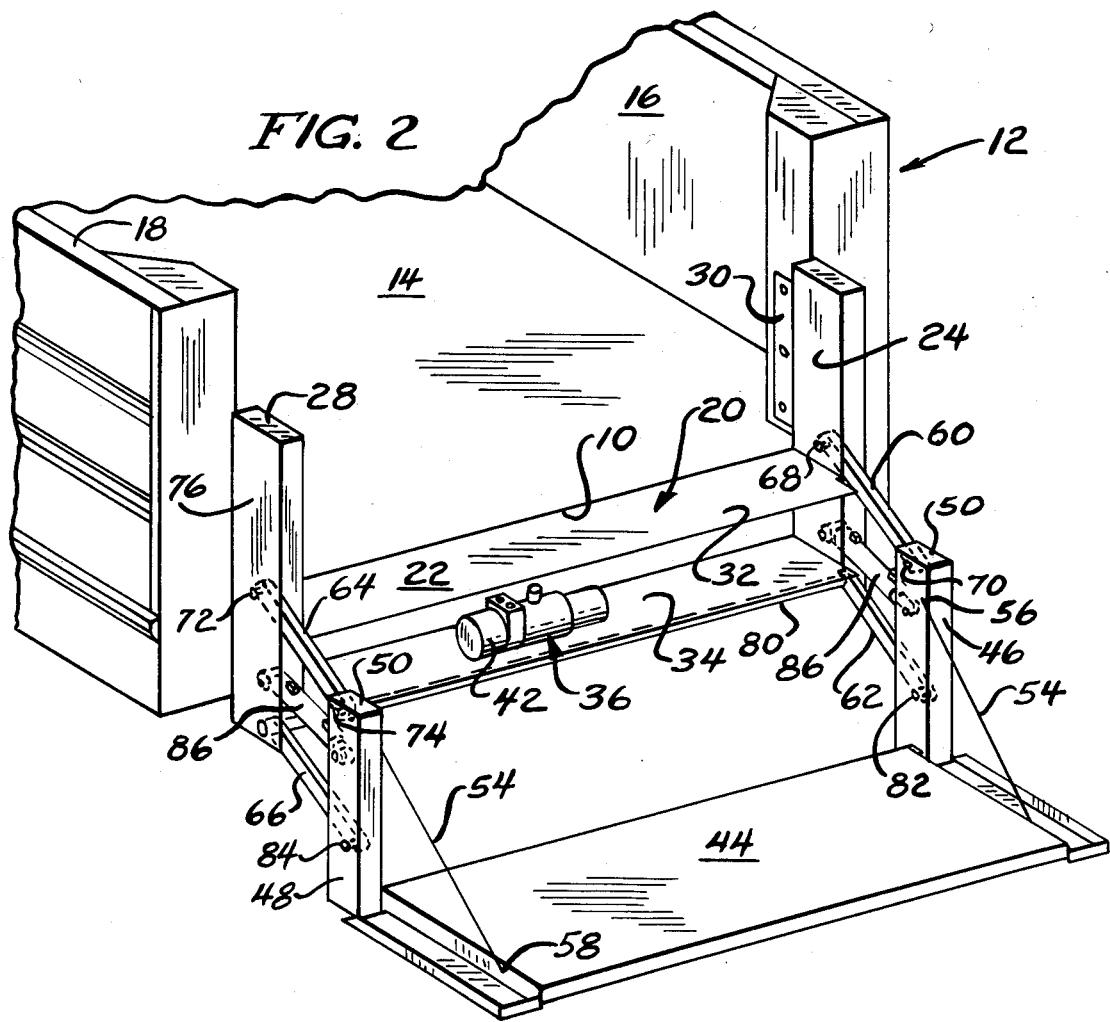
FIG. 2 is a view similar to FIG. 1 but illustrating the gate in a lowered position.

An exemplary embodiment of a lift gate assembly made according to the invention is illustrated in the drawings and with reference to FIGS. 1 and 2 is seemed to be secured to the rear end 10 of a truck, generally designated 12, only part of which is shown. The truck 12 includes a horizontal bed 14 flanked by upstanding side walls 16 and 18 respectively.

The lift gate assembly of the invention includes a U-shaped base, generally designated 20, having a central section 22. At opposite ends of the central section 22, upstanding legs 24 and 26 are located. The legs 24 and 26 may be formed of channels and open rearwardly. Their upper ends may be closed by end plates 28 if desired and mounting brackets 30 (only one of which is shown) may be secured to each for attachment to respective ones of the side walls 16 and 18 such that the upper surface of the central section 22 is coplanar with the truck bed 14.

As seen in FIGS. 1 and 2, the central section 22 may include an upper plate 32 and a lower plate 34 extending between the legs 24 and 26 to define a housing. If desired, the openings between the plates 32 and 34 may be closed with covers (not shown). Within the housing thus defined and mounted on the lower plate 34, there is disposed a pumping unit, generally designated 36. The pumping unit 36 includes a hydraulic pump 38 (FIG. 4), an internal reservoir 40 (FIG. 4) and an electric drive motor 42 which may be powered by the electrical system of the truck 12 in which the lift gate assembly is mounted.

The lift gate assembly also includes a gate 44 which sometimes, but not always, may be the tailgate with which the vehicle 12 was originally equipped. Associated with the gate 44, and in alignment with corresponding ones of the legs 24 and 26, are upstanding legs 46 and 48 respectively. The legs 46 and 48 are parallel to the legs 24 and 26 respectively and may be formed of forwardly opening channels having their tops closed by plates 50. By means of a horizontal pivot 52 (FIG. 3 only), the gate 44 is pivoted to the legs 46 and 48 near their lower extremities. A cable 54 extends between each leg 46 and 48 from a point 56 near the upper end of the corresponding leg to a point 58 near the edge of the gate 44 remote from the pivot 52. Thus, the gate 44 may be pivoted to a vertical, closed position closing the bed 14 and locked thereat by conventional means (not shown) or moved to a horizontal position as illustrated in the drawing whereat its uppermost surface may act as a cargo support during loading and unloading of the vehicle with the cables 54 maintaining the gate 44 in such a horizontal position.

The legs 24 and 46, along with links 60 and 62 define a first parallelogram linkage while the legs 26 and 48, along with links 64 and 66 also define a parallelogram linkage. The links 60 and 62 are parallel to each other as are the links 64 and 66 as are the links 62 and 66 and the links 60 and 64, respectively.

As best seen in FIGS. 2 and 3, the link 60 has one end connected by a pivot 68 to the leg 24 and its other end connected by a pivot 70 to the leg 46. Corresponding pivots for the link 64 are shown at 72 and 74 respectively, in FIG. 2 only.

The link 62 has one end rigidly connected to a torsion rod or bar 80 which in turn is pivoted to the leg 24 near the lower extremity thereof and thus is lower than the pivot 68. The opposite end of the link 62 is connected by a pivot pin 82 to the leg 46 just above the pivot 52 for the gate 44 and thus is well below the pivot 70. The link 66 is likewise rigidly connected to the torsion bar 80 which extends the entire length of the central section 22 and is also connected to the leg 48 by a pivot pin 84 corresponding to the pivot pin 82.

The mechanical construction is completed by the provision of a double acting hydraulic cylinder 86 in each of the parallelogram linkages. Each cylinder 86 has its head end 88 connected by a pivot pin 89 to the leg 24 or the leg 26, as the case may be, at a location near the lower pivot 80 and the upper pivot 68 or 72, as the case may be.

The rod 90 of each cylinder 86 is connected by a pivot pin 92 to the leg 46 or 48 as the case may be at a location closer to the pivot pin 70 or 74 than the pivot pin 82 or 84. Thus, the cylinders 86 are always in non-parallel relation to the links 60, 62, 64, 66 and of legs 24, 26, 46, 48. The actual spacial relationship is best illustrated in FIG. 3 which is drawn substantially to scale.

This configuration of components, amongst other things, result in the links and cylinders being virtually wholly contained within the channel shaped legs 24, 26, 46, 48 when the gate is in its uppermost position as can be seen in both FIGS. 1 and 3. The linkage only becomes exposed when the gate 24 is in a transitory position as regards vehicle traveling, that is, in a position which is not utilized when the vehicle is in motion. Thus, the working components of the system are housed the vast majority of the time.

FIG. 4 illustrates one possible control schematic for the lift gate assembly. As shown therein, the cylinders 86 are double acting cylinders and it will be recalled from the previous discussion, that the head ends 88 of the cylinders 86 are connected to the legs 24 and 26 respectively. Thus, application of fluid under pressure to the head ends 88 along a hydraulic line 100 will result in the gate assembly being lifted from the dotted line position illustrated in FIG. 3 to the solid line position in that Figure. Positive movement in the opposite direction under influence of hydraulic fluid under pressure can be achieved by applying pressurized fluid to a line 102 which is in fluid communication with the rod ends of the cylinders 86. Since downward movement of the gate will be assisted by gravity, the fact that somewhat lesser power will be available for downward movement than the upward movement (by reason of the lesser effective area of the rod end side of the pistons of the cylinders) is not a disadvantage. In fact, it is an advantage because the maximum power configuration of the cylinders is utilized for lifting purposes.

To control which of the lines 100 and 102 is connected to a source of hydraulic fluid under pressure, namely, the pump 38, a valve having a spool 104 configured as schematically illustrated in FIG. 4 may be utilized. The spool 104 is connected via a link 106 to a handle 108. If the handle 108 is pivoted in the counter clockwise direction, the line 100 will be connected to the pump 38 while the line 102 will be connected to the reservoir 40 to raise the gate 44. Conversely, when the handle 108 is pivoted in the clockwise direction, the line 102 will be connected to the pump 38 while the line 100 will be connected to the reservoir 40 and the gate will be powered to the lowered position. When the handle 108 is in the position illustrated, both the lines 100 and 102 will be blocked and the gate 44 will remain in whatever position it had previously been moved to.

Desirably, suitable electric switching means may be mechanically linked to the spool 104 so as to energize the motor 42 to operate the pump 38 only when the spool 104 is shifted either to the left or the right of the position illustrated in FIG. 4 to conserve electrical energy.

Because this configuration provides for positive powering of the gate 44 to a lowered position, difficulties of operation in cold weather of prior art constructions are avoided.

Furthermore, it will be appreciated that the unique configuration of the cylinders 86 within the parallelogram linkages defined by the various links and legs provides a very real advantage in lifting over prior art constructions. In particular, movement of the gate from its lowered position upward will occur at a very slow rate when such movement is initiated even though there will be substantial extension of the rods 90 of the cylinders 86 at that time. Those skilled in the art will thus recognize that maximum lifting power is thus applied at the initiation of upward movement of the gate 44, precisely at a time when it is most needed.

"Tippiness" in the gate 44 by reason of off-center loading is also avoided by the presence of the rod 80 being ridgly connected to both of the links 62 and 60 because the rod 80 torsionally resists any twisting force tending to move the axis defined by the pivots 82 and 84 out of a horizontal plane. Thus, the possibility of an inadvertent spill of cargo on the gate 44 during a raising or lowering operation due to twisting of the gate 44 as a consequence of an off-center load is likewise avoided.

At the same time, all of the desirable features of Brown's lift gate assembly insofar as providing an assembly readily adaptable to small and medium sized vehicles, are retained.

I claim:

1. A lift gate assembly for a truck or the like comprising:
   a generally U-shaped base having a generally horizontal central section flanked by generally parallel, upstanding legs;
   a gate;
   a pair of upstanding legs secured to said gate in spaced relation so as to be aligned with a corresponding leg on said base;
   two pair of links, pivotally connected to and extending between each of said legs on said base and the corresponding leg in said pair whereby each pair of links and associated legs defines a parallelogram;
   motor means interconnecting said base and said gate and operable to cause relative movement between the same along a path defined by said parallelogram linkages; and
   a torsion bar pivotally mounted between said base legs and extending between and rigidly attached to a corresponding link in each of said pairs.

2. The left gate assembly of claim 1 wherein said torsion bar further defines pivotal connections of the associated links to an associated leg.

3. The lift gate assembly of claim 1 wherein said torsion bar further defines pivotal connections of the associated links to the associated leg on said base.

4. The lift gate of claim 3 wherein said pivotal connections are below the uppermost extremity of said central section so that said torsion bar is also below said upper extremity.

5. The lift gate of claim 1 wherein said motor means comprise a pair of hydraulic cylinders, one in each of said two pair of links, and extending between and pivoted to the legs to which the associated links are connected, said cylinders being non-parallel to both said links and said legs.

6. A lift gate assembly for a truck or the like and comprising:
   a base including a first pair of spaced upstanding channel-like legs;
   a gate;
   a second pair of spaced upstanding channel-like legs secured to said gate, the legs of said second pair being ganerally aligned with corresponding legs in said first pair to define two linkage pairs of legs with each linkage pair including a leg from each of said first and second pair and with the associated legs of each linkage pair opening toward each other;
   two pair of parallel links, one for each of said linkage pairs, the links of each pair extending between and pivotally interconnecting the legs of the corresponding linkage pair to define two parallelogram linkages each having upper and lower pivots on the leg in the first pair and upper and lower pivots on the leg in the second pair; and
   two hydraulic cylinders, one for each parallelogram linkage, each cylinder having one end pivotally connected to the leg in the first pair at a location closer to the lower pivot thereon than the upper pivot thereon and its other end pivotally connected to the leg in the second pair at a location closer to the upper pivot thereon than to the lower pivot thereon, said cylinders being located wholly between the parallel links of the associated pair to be wholly receivable within the corresponding legs along with the associated parallel links when the legs of the first and second pairs are aligned.

7. The lift gate assembly of claim 6 wherein said one end of said cylinders is the head end and said other end is the rod end; and said cylinders are double acting.

8. The lift gate assembly of claim 6 wherein said lower pivots on the legs in said first pair are defined by an elongated rod rigidly affixed to the corresponding links in said pair of parallelogram linkages.

* * * * *